(12) United States Patent
Stevenson

(10) Patent No.: US 6,777,627 B1
(45) Date of Patent: Aug. 17, 2004

(54) REMOTE CONTROL AND RACKING DEVICE FOR MEDIUM-VOLTAGE CIRCUIT BREAKERS

(75) Inventor: Robert L. Stevenson, Tucson, AZ (US)

(73) Assignee: Remote Solutions, LLC, Tucson, AZ (US)

( * ) Notice: Subject to any disclaimer, the term of this patent is extended or adjusted under 35 U.S.C. 154(b) by 0 days.

(21) Appl. No.: 10/687,103

(22) Filed: Oct. 16, 2003

(51) Int. Cl.[7] .................................................. H01H 9/00
(52) U.S. Cl. ................................. 200/50.21; 200/50.24
(58) Field of Search ........................... 200/50.21–50.26; 361/605–610, 615, 619

(56) References Cited

U.S. PATENT DOCUMENTS

| | | | | |
|---|---|---|---|---|
| 3,716,684 A | * | 2/1973 | McMillen et al. | 200/50.21 |
| 5,453,587 A | * | 9/1995 | Hurley et al. | 200/50.24 |
| 5,477,017 A | * | 12/1995 | Swindler et al. | 200/50.24 |
| 6,388,869 B1 | * | 5/2002 | Fauteux et al. | 361/625 |
| 6,404,620 B1 | * | 6/2002 | Piccione | 361/601 |

OTHER PUBLICATIONS

Brochure—"Replacement Breaker Accessories," Powell Apparatus Service Division.
Brochure—"The SARRACS Safety Remote Breaker Racking System," Siemens, Nov. 21, 2002.

* cited by examiner

Primary Examiner—Michael A. Friedhofer
(74) Attorney, Agent, or Firm—Antonio R. Durando; Quarles & Brady Streich Lang LLP

(57) ABSTRACT

A remote control system for vertically racking circuit breakers into and out of electrical switchgear cells includes a lever mechanism for coupling the drive shaft of a portable drive motor to the driven shaft of a circuit-breaker racking mechanism and a latching solenoid for locking the coupled shafts together. A power-transfer panel is provided in the cell and is connected for transferring control of the drive motor, the latching solenoid and the circuit breaker to a remote control and status indicating device that is located externally of the cell cabinet. An inclinometer is mounted on the circuit breaker for producing an alarm signal and interrupting operation of the circuit-breaker elevating mechanism upon detecting an excessive amount of tilting in the normally level attitude of the circuit breaker.

20 Claims, 4 Drawing Sheets

REMOTE CONTROL AND RACKING DEVICE FOR MEDIUM-VOLTAGE CIRCUIT BREAKERS

BACKGROUND OF THE INVENTION

1. Field of the Invention

This invention relates in general to electrical switchgear servicing equipment and more particularly to a remotely operated system for circuit breaker operation and for racking circuit breakers into and out of engagement with the primary and secondary disconnect terminals within the electric switchgear.

2. Description of the Prior Art

It is well known in the power distribution industry that personnel who work on or near energized electrical equipment can be seriously injured or killed as a result of arcing faults. An arcing fault is the flow of current through the air between phase conductors and neutral or ground and can result in a tremendous release of energy in the form of extremely high temperatures and pressures along with shrapnel hurling through the air at high velocity. For this reason, when repair work or periodic maintenance needs to be accomplished on medium-voltage switchgear cells and/or on the associated circuit breakers, the circuit breakers are tripped (opened) and moved out of conductive contact with the primary and secondary disconnects and removed from the switchgear cell. Such operations of the circuit breakers is referred to in the industry as "racking-out", and reinstallation is referred to as "racking-in". In some medium-voltage switchgear equipment, racking the circuit breaker out is accomplished by horizontally moving the circuit breaker within the switchgear cabinet which disconnects the circuit breaker from the switchgear power terminals enabling its removal from the cabinet. In another type of switchgear configuration, racking-out is accomplished by vertically lowering the circuit breaker to disengage it from the switchgear power terminals and subsequently moving it horizontally out of the cabinet. The racking-in of this type of equipment is accomplished by horizontally moving the circuit breaker back into the cabinet and elevating it into conductive contact the switchgear power terminals. The present invention is intended for use with the latter type of switchgear equipment, thus this discussion of the prior art will be directed to that type of equipment.

In the absence of any specialized racking equipment, a racking-out operation in this type of a switchgear cell is accomplished by opening the cell-cabinet door to gain access to a circuit-breaker control switch and a racking-motor platform provided in the cell cabinet. The circuit-breaker control switch is used to trip (open) the circuit breaker, and a portable electric motor is mounted on the racking-motor platform. The drive member of the electric motor engages a slide-clutch driven member of the circuit-breaker elevating mechanism to form a coupling and a slide-clutch lever is manually operated to lock the coupled members together. A toggle switch that is located adjacent the racking motor, is then used to run it in a direction which causes the circuit-breaker elevating mechanism to lower the circuit breaker, and when lowered, it can be wheeled out of the cell cabinet. When the maintenance work is finished, the circuit breaker is wheeled back into the cell cabinet and the toggle switch is used to run the motor in the reverse direction to operate the circuit-breaker elevating mechanism to raise the circuit breaker back into conductive contact with the switchgear power terminals. The portable motor is then removed and a circuit-breaker control switch provided on in the cell cabinet door is used to close the circuit breaker. It will be appreciated from the above, that the cell-cabinet door must be open and a worker must be in very close proximity to the equipment to accomplish opening and closing of the circuit breaker and the racking-out and racking-in operations. Thus, the worker is well within the arc-flash danger zone and could be seriously injured or killed in the event of an arc fault. Therefore, it is preferred that some sort of remotely operated mechanism be used to accomplish the circuit-breaker control and racking operations.

Remote racking systems provided by manufactures such as General Electric, Westinghouse, Square D and Siemens are available and some of these systems will only work on the horizontally racked circuit breakers of the switchgear cells discussed above. The prior art remote racking systems that are capable of vertically racking the second type of switchgear cells do provide some worker safety benefits. Workers can perform the racking-in and racking-out operations from a safe distance, however, they must still reach into the cell cabinet to trip and reset the circuit breaker and the cell cabinet doors must be open during the racking operations. A remote racking system which was recently introduced by General electric does allow the cell cabinet door to be closed during the racking operations. However, the worker must still stand in front of the open cell cabinet door to accomplish the tripping, charging and closing functions of the circuit breaker.

In addition, the circuit breakers in the vertically racked type of switchgear cells must remain level during vertical movement. If excessive deviation in the normally level attitude of the circuit breaker should happen because of elevating equipment malfunction, considerable damage due to misalignment of the switchgear and circuit-breaker terminals can result and can cause an arc fault. It is very difficult, if not impossible, for a worker standing off to the side of the cell at a distance of twenty five or thirty feet to detect tilting of a circuit breaker in time to prevent equipment damage and a resulting arc fault. The prior art remote racking systems make no provisions for monitoring the inclination of circuit breakers during racking operations and interrupting racking motor operation upon detection of an irregular tilt angle. Therefore a need exists for a new and improved remote circuit breaker control and racking system for use on switchgear cells of the type requiring vertical movement for racking-out and racking-in of the circuit breakers.

SUMMARY OF THE INVENTION

In accordance with the present invention, switchgear cells are modified to include an inclinometer for monitoring the attitude of the circuit breaker, and a solenoid operated latching device interacts with a keyed slide-clutch lever for releaseably interconnecting a portable drive motor and the circuit-breaker racking mechanism. A power transfer panel is mounted inside the cell cabinet for transferring control of the circuit breaker and racking operations to a location external of the cell cabinet. A remote control and status-indicating device is demountably coupled through the cell cabinet to the power transfer panel to allow a worker to accomplish the circuit breaker control and racking operations from a remote location and be advised of the status of the operations taking place within the closed cabinet.

The inclinometer is mounted in any convenient location on the circuit breaker and is a dual-axis monitoring device which automatically measures and sets a "relative zero"

reference and will sense angular deviations in the fore-and-aft and lateral attitudes. Upon sensing an excessive angular deviation, which is indicative of a malfunction in the circuit breaker elevating mechanism, the inclinometer will display axis trip angles and provide local and remote visual alarm signals and will automatically interrupt operation of the circuit-breaker elevating mechanism drive motor.

Due to the relatively infrequent need for performing racking operations on switchgear cells and the relatively high cost of racking drive motors, it is a common practice to use a portable motor which is installed in a cell on an as needed basis. When a drive motor is installed in a switchgear cell that is modified in accordance with the present invention, it is clamped in place and the worker operates a special lever mechanism to move a slide-clutch driven member of the elevating mechanism into engagement with the drive member of the motor. A latch key is mounted on the lever mechanism and is movable with the lever into engagement with a latching solenoid to hold the drive and driven members in locked engagement with each other. Upon completion of the racking operation, the worker actuates the latching solenoid from the remote location to disengage the drive and driven members.

As previously mentioned, the power transfer panel transfers control of each circuit breaker control function and the racking functions to the remote control and status-indicating device located externally of the switchgear cell. The power transfer panel is electrically connected to the circuit breaker trip and close circuits, a plug-in junction box which interfaces the existing control power and limit switches, the elevator drive motor, the solenoid operated latching mechanism and the inclinometer. A cable extends from the power transfer panel to a connector mounted in the door of the cell cabinet so that the remote control device can be coupled through the closed cell door during circuit breaker control and racking operations. The remote control device is attachable to the door mounted connector by an elongated cable which allows it to be moved to a safe location away from the cell. The remote control and status-indicating device is configured to allow the worker to remotely control each electrically operated circuit breaker function and all the racking operations and provide the worker with visual indications of the status of all of the operations.

DESCRIPTION OF THE PREFERRED EMBODIMENT

Figure 1:
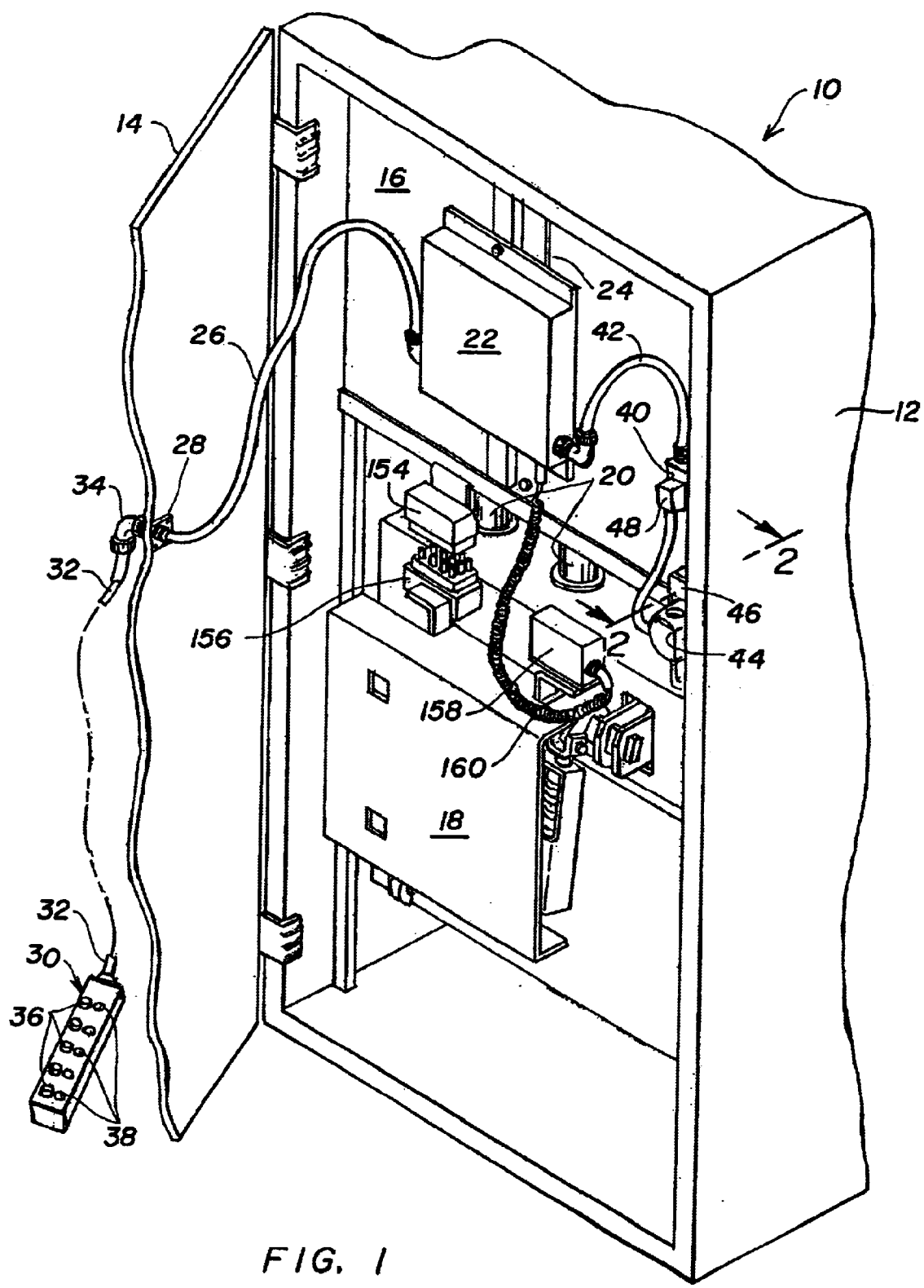
FIG. 1 is a fragmentary perspective view of a switchgear cell configured in accordance with the present invention.

Referring more particularly to the drawings, FIG. 1 shows a switchgear cell which is indicated in its entirety by the reference numeral 10. To insure a clear understanding of the present invention, a brief description of the switchgear cell 10 and some of its functions will now be presented.

The switchgear cell 10 has the usual cabinet 12 with a door 14 that provides access to the interior of the cabinet. The equipment in the cabinet includes the switchgear 16 and a movable circuit breaker 18. Due to the inherent danger associated with medium-voltage equipment whenever repair work or periodic maintenance needs to be performed on the equipment, the circuit breaker 18 is tripped (opened) and moved to separate the movable primary terminals 20 carried by the circuit breaker 18 from the stationary terminals (not shown) of the switchgear 16. The switchgear cell 10 is of the type in which the circuit breaker 18 is vertically moved to disconnect and subsequently reconnect the terminals and this is referred to in the industry as "racking-out" and "racking-in". The functions of the circuit breaker include "resetting" (closing) to allow the flow of current through the breaker, "tripping" (opening) to prevent current flow and "charging" which is required for closing of the breaker. In circuit breakers of the stored energy type, charging is accomplished by loading of the springs provided on the circuit breaker, and charging is accomplished in another type of circuit breaker by operation of a solenoid.

The switchgear cell 10 is shown as having been modified in accordance with the present invention to include a power transfer panel 22 that is attached by means of a mounting bracket 24 to the switchgear 16. The power transfer panel 22 contains suitable relays, circuitry and other electronic devices (not shown) for. transferring management of the electrically operated circuit breaker functions and the racking operations to a location external of the cell cabinet 12. A cable 26 extends from the power transfer panel 22 to a connector 28 that is mounted so as to extend through the cabinet door 14. A remote-control and status-indicating device 30 has an elongated cable 32 with a suitable connector plug 34 on its distal end for demountable connection to the door mounted connector 28. A plurality of function-control switches 36 and status-indicating lights 38 are provided on the remote-control device 30 to allow a worker to control the circuit breaker functions and the racking functions from a safe distance with the cell door securely closed and to be advised of the status of the functions.

The control power and limit switches (not shown), that are normally provided in switchgear cells for controlling the racking operations, are electrically connected to a switchgear control receptacle (not shown), and a junction box 40 is plugged into the switchgear receptacle. A cable assembly 42 is connected between the junction box 40 and the power transfer panel 22 to transfer operation of the power control and limit switches (not shown) through the power transfer panel 22 to the remote-control device 30. Among the functions transferred through the power transfer panel 22 is control of a drive motor 44 which, as will hereinafter be described in detail, is portable and is intended to be mounted in the cell cabinet 12 whenever a racking operation is to be performed. The motor 44 is electrically connected to a terminal box 46 that is mounted on the motor, and a cable assembly 48 extends from the terminal box 46 for demountable connection to the junction box 40. Thus, the portable motor 44 is electrically coupled to the power transfer panel 22, which in turn is coupled to the remote control device 30 is as previously described, so that control of the motor's operation is accomplished at the remotely located device 30.

Figure 2:
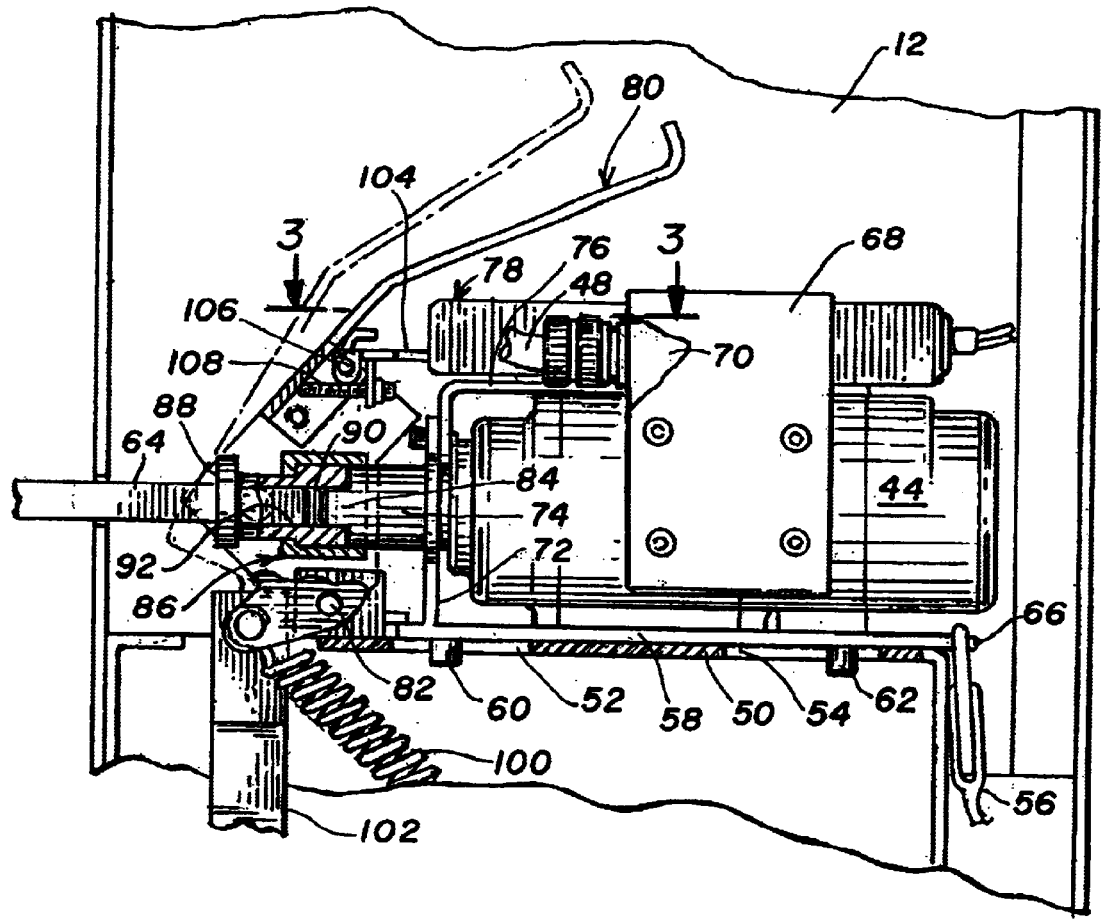
FIG. 2 an enlarged fragmentary sectional view taken along the line 2—2 of FIG. 1
Figure 3:
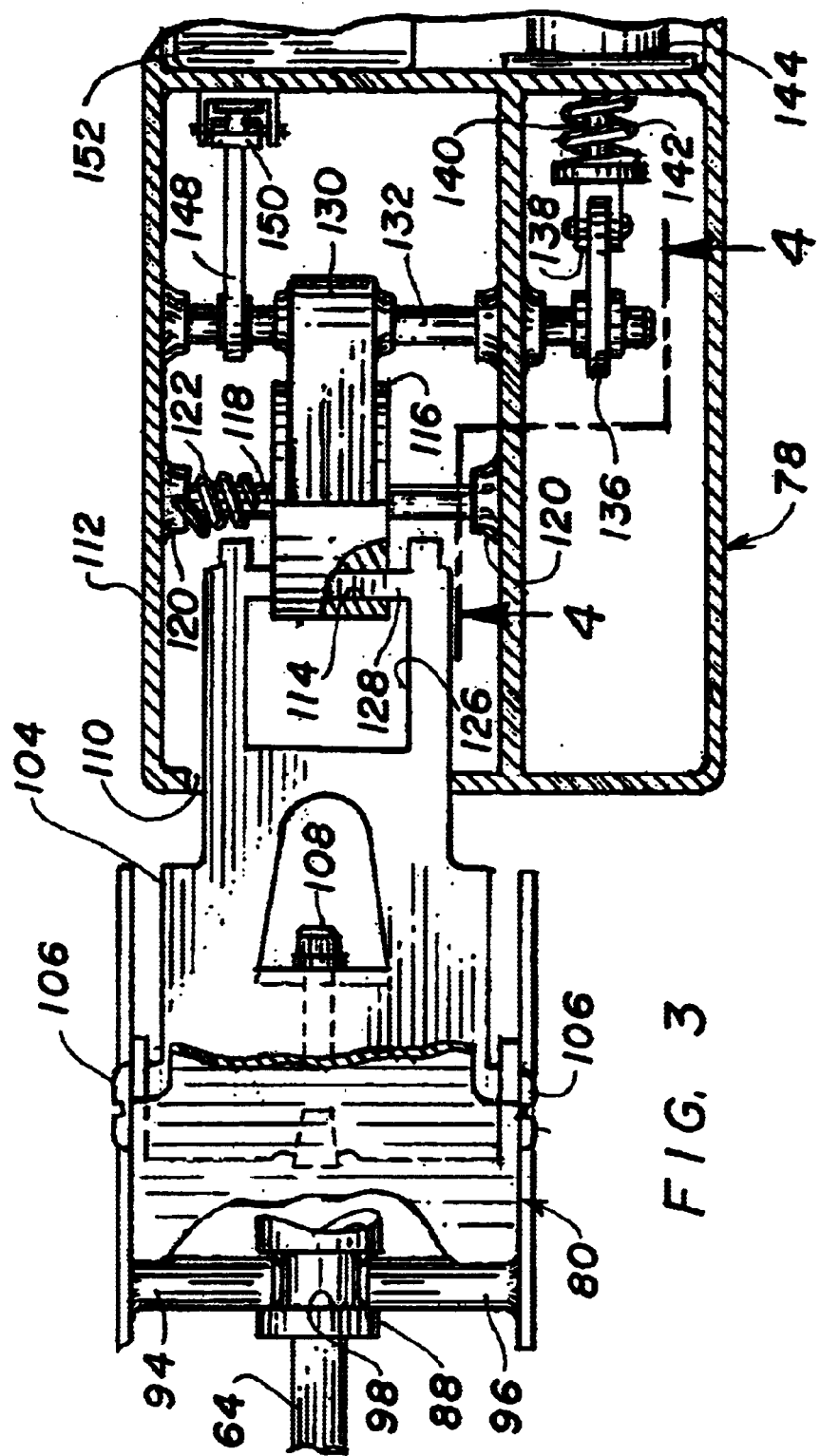
FIG. 3 is a fragmentary sectional view taken along the line 3—3 of FIG. 2.
Figure 4:
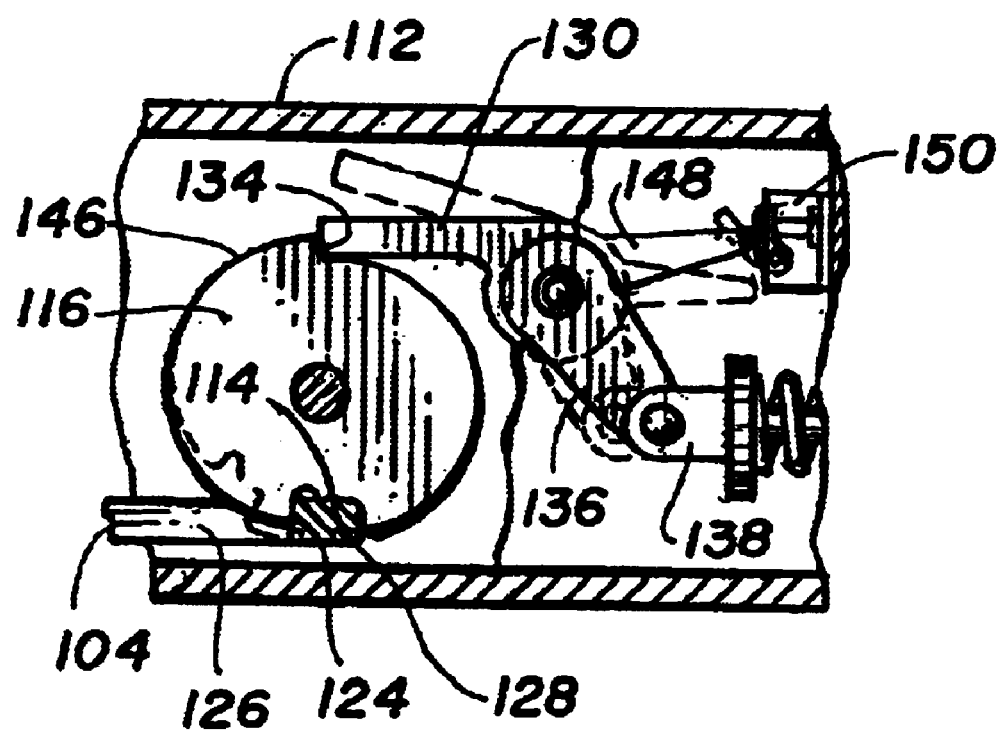
FIG. 4 is a fragmentary sectional view taken along the line 4—4 of FIG. 3.

Reference is now made to FIGS. 2, 3, and 4 wherein mounting and operational functions of the drive motor 44 are shown. As is customary, a motor mounting platform 50 is provided in the cabinet 12 and a pair of spaced apart clearance holes 52 and 54 are formed therein and a latch 56 is mounted at the back end of the platform 50. The drive motor 44 is carried on a mounting base 58 which has a pair of pegs 60 and 62 depending therefrom so as to fit into the clearance holes 52 and 54 respectively when the motor is placed on the platform 50. The pegs 60 and 62 and the holes 52 and 54 are arranged so that the motor 44 will be in axial alignment with the drive shaft 64 of the circuit breaker elevating mechanism (not shown). A tongue 66 extends from the back end of the motor mounting base 58 and the latch 56 is used to secure the base 58 and thus the motor 44 on the platform 50. A bracket 68 is mounted on the motor and a terminal box 70 is mounted therein for electrically connecting the cable 48 to the motor 44. A standard 72 is provided at the front end of the mounting base 58 and is configured to circumscribe the drive end of the motor 44 with the drive shaft 74 thereof extending through the standard. A solenoid mounting plate 76 is attached to the upper end of the standard 72 and as will hereinafter be described, a latching solenoid assembly 78 is carried atop the solenoid mounting plate 76.

An especially configured manually operated lever mechanism 80 replaces the usual lever (not shown) and is mounted in the customary position at the front end of the motor mounting base 58 by a pivot pin 82 for movement between a clutch engaged position shown in solid lines and a clutch disengaged position indicated in phantom lines. The distal end of the motor drive shaft 74 is configured to provide a drive member tongue 84 of a clutch 86. The slide clutch driven member 88 of the clutch 86 is of cylindrical configuration with a slot 90 formed therein for receiving the clutch drive member tongue 84. The driven member 88 has an axial bore 92 which is of square cross-section so that the member is slidably movable on the similarly configured square-cross-section drive shaft 64 of the circuit breaker elevating mechanism. As seen best in FIG. 3, the pivotably movable lever mechanism 80 has a pair of pegs 94 and 96 which extend inwardly toward each other and are disposed on diametrically opposed sides of an annular groove 98 formed in the driven slide clutch member 88. Therefore, when the lever mechanism 80 is pivotably moved to the illustrated solid line position, the driven clutch member 88 will be axially moved on the drive shaft 64 into engagement with the clutch drive member tongue 84. The lever 80 has a spring 100 and a depending bar 102 attached thereto which are parts of the usual safety interlocking mechanisms of the switchgear.

A latch key 104 is mounted on suitable pins 106 carried by the lever 80 so it is movable with the lever toward and away from the latching solenoid assembly 78 carried atop the motor 44. The latch key 104 is pivotably movable on the mounting pins 106 and an adjustment screw 108 is provided to set the position of the latch key so that it aligns with an opening 110 provided in the solenoid housing 112. When the latch key 104 is moved toward the solenoid 78 (see also FIG. 2), it will move through the solenoid opening 110 into engagement with a first notch 114 formed in a ratchet wheel 116 that is mounted for rotation with an axle 118 that is journaled in suitable bearing bosses 120 provided in the housing 112. The latch key 104 will rotate the ratchet wheel 116 from an unlatched position shown in dashed lines in FIG. 4, to a latched position shown in solid lines in the same figure. A spring 122 (FIG. 3), having one end attached to one of the bearing bosses 120 and the other end secured to the axle 118, biases the ratchet wheel 116 to its unlatched position. Rotation of the ratchet wheel 116 against the bias applied by the spring 122 will move a locking shoulder 124 formed on the wheel into an opening 126 formed in the latch key 104 and into bearing engagement with a cross bar 128 provided at the leading edge of the latch key. A pawl 130 carried for rotation on an axle 132 will move into engagement within a second notch 134 formed in the ratchet wheel 116 and will hold it in the latched position.

The axle 132 is journaled in suitable bearing bosses provided in the solenoid housing 112 with one end of the axle having a lever 136 mounted thereon. As illustrated in FIG. 4, a clevis 138 is connected to the lever 136 and the clevis is carried on the distal end of a solenoid shaft 140. A spring 142 applies a biasing force on the clevis 138 so that the lever 136 is moved to rotate the pawl 130 into a disengaged position when the solenoid 144 is in a deactuated state. When the solenoid is actuated, the pawl 130 is rotated into bearing engagement with a cam surface 146 on the ratchet wheel so that the pawl will snap into engagement with the second notch 134 of the wheel 116 when the latch key 104 rotates the ratchet wheel to its latched position. A second lever 148 is fixed for rotation with the axle 132 for moving into and out of engagement with an actuating device 150 of a switch 152. The switch 152 is wired th rough the junction box 40 and the power transfer panel 22 to the remote control 30 to provide a visual indication when the drive motor 44 is in latched engagement with the drive shaft 64 of the circuit breaker elevating mechanism.

An electric receptacle 154 (FIG. 1) is mounted on the switchgear 16 and an electric lug 156 is mounted on the circuit breaker 18. When the circuit breaker, which is shown in an intermediate position, is raised to the racked-in position, the plug 156 will engage the receptacle 154 to supply power to the circuit breaker 18 for controlling the charging, closing and tripping functions necessary for circuit breaker operations. The power is supplied from the junction box 40 through the power transfer panel 22 to the control switches 36, which are labeled as the "trip" (or open), "reset" (or closed), "raise" and "lower" on the remote control device 30. Also, two of the status lights 38 are wired to provide visual indications of the clutch locked and fault status of the remote racking system. Thus, when the circuit breaker 18 is in the elevated position, the remote control device 30 is used to "trip" the circuit breaker to start a racking-out operation and to unlock the clutch allowing the removal of the circuit breaker from the cell cabinet. In a racking-in operation, the remote control device 30 is used to unlock the clutch allowing the circuit breaker to "charge" to complete the racking in operation and make the breaker ready for a "reset" command from the device 30.

An inclinometer 158, which is preferably digital, can be mounted in any suitable location on the circuit breaker 18, and is electrically coupled to the power transfer panel 22 by a cable assembly 160. The inclinometer 158 is a dual-axis monitoring device configured to sense changes in the normally level attitude of the circuit breaker 18 in fore and aft and lateral directions. Upon sensing angular deviations above an adjustably preset threshold, which is indicative of a malfunction in the circuit breaker elevating mechanism, the inclinometer is preferably configured to produce a local display of axis-fault angle and operational status and send an electric signal to the remote control device 30 to provide a visual signal by illuminating one of the status indicating lights 38. The inclinometer 158 is electrically coupled into the control circuit of the latching solenoid 78 to hold the drive and driven members of the clutch in locked engagement with each other and will automatically interrupt power to the drive motor of the elevating mechanism when a problem with the circuit breaker attitude is detected. An inclinometer suitable for this purpose is identified by the Trademark LimiTilt, Model No. SR-M-75T-2 and is available from Remote Solutions, LLC, of Tucson, Ariz.

While the principles of the invention have now been made clear in an illustrated embodiment, many modifications will be obvious to those skilled in the art which do not depart from those principles. The appended claims are therefore intended to cover such modifications within the limits only of the true spirit and scope of the invention.

What I claim is:

1. A remote control system for operating a circuit breaker and racking the circuit breaker into and out of electric contact with switchgear contained in a cell cabinet, wherein the circuit breaker is movable by a racking mechanism between racked-in and racked-out positions, the racking mechanism having a driven shaft and the circuit breaker having a plug which is electrically connected to a receptacle provided on the switchgear when the circuit breaker is in the racked-in position to provide power for operation of circuit breaker functions, said remote control system comprising:

a) a portable drive motor for mounting in the cell cabinet and having a drive shaft which aligns with the driven shaft of the racking mechanism;

b) a lever mounted in said cell cabinet for movement from a disconnected position to a connected position wherein the driven shaft of the racking mechanism is coupled to the drive shaft of said drive motor, said lever having a latch key;

c) a latching solenoid for engaging the latch key of said lever to hold said lever in the connected position;

d) an electrical connector mounted to extend through the cell cabinet;

e) a remote control device connected by an elongated cable to said electrical connector; and f) transfer means electrically connected to transfer operational control of said drive motor, said latching solenoid, and the opening, closing and charging of the circuit-breaker through said electrical connector to said remote control device.

2. A remote control system as claimed in claim 1 wherein said transfer means comprises:

a) a junction box electrically connected to the receptacle of the switchgear, to said latching solenoid and to said drive motor; and b) a power transfer panel electrically coupled between said junction box and said electric connector for transferring the operational control through said electrical connector to said remote control device.

3. A remote control system as claimed in claim 1 and further comprising status-indicating means on said remote control device and electrically connected through said transfer means to receive status-indicating signals from the circuit breaker, from said drive motor and from said latching solenoid.

4. A remote control system as claimed in claim 1 and further comprising a switch mounted on said latching solenoid and coupled thereto to provide status indicating signals indicative of the connected position of said lever.

5. A remote control system as claimed in claim 4 and further comprising a cable assembly connecting said drive motor and said switch to said transfer means to establish electrical interconnections therebetween.

6. A remote control system as claimed in claim 1 and further comprising a cable assembly connecting said transfer means to said electrical connector for establishing electrical interconnection therebetween.

7. A remote control system as claimed in claim 1 and further comprising an inclinometer mounted on the circuit breaker for detecting angular deviations in the attitude of the circuit breaker and producing at least one alarm signal when an angular deviation at least equal to a predetermined amount is detected.

8. A remote control system as claimed in claim 1 and further comprising an inclinometer mounted on the circuit breaker for detecting angular deviations in the attitude of the circuit breaker in fore-and-aft and lateral directions and producing at least one alarm signal when an angular deviation at least equal to a predetermined amount is detected.

9. A remote control system as claimed in claim 1 and further comprising an inclinometer mounted on the circuit breaker for detecting angular deviations in the attitude of the circuit breaker in fore-and-aft and lateral directions and interrupting operation of the circuit breaker racking mechanism upon detecting an angular deviation at least equal to a predetermined amount and providing an alarm signal indicative thereof at said remote control device.

10. A remote control system as claimed in claim 9 wherein said inclinometer is digital.

11. A system for monitoring the attitude of a circuit breaker which is racked into and out of electric switchgear contained in a cell cabinet by a racking mechanism, said system comprising:

a) a portable drive motor mounted in the cell cabinet;

b) coupling means for operatively connecting and disconnecting the circuit breaker racking mechanism and said drive motor; and c) an inclinometer mounted on the circuit breaker for monitoring the attitude of the circuit breaker and generating at least one signal upon detecting an angular deviation in the attitude of the circuit breaker at least equal to a predetermined amount.

12. A system as claimed in claim 11 wherein said inclinometer is digital.

13. A system as claimed in claim 11 wherein said inclinometer generates a local display of an axis tilt angle when detecting a normally level attitude of said circuit breaker and generating an alarm signal upon detection of an angular deviation in the attitude of the circuit breaker at least equal to the predetermined amount.

14. A system as claimed in claim 11 wherein said inclinometer generates a signal that interrupts operation of said portable drive motor upon detection of an angular deviation in the attitude of the circuit breaker at least equal to the predetermined amount.

15. A system as claimed in claim 11 wherein said inclinometer generates a signal that is directed to said coupling means for maintaining an interconnection of the circuit-breaker racking mechanism and said drive motor upon detection of a normally level attitude of the circuit breaker.

16. A system as claimed in claim 15 wherein said inclinometer generates an alarm signal and interrupts operation of the circuit-breaker racking mechanism upon detection of an angular deviation in the attitude of the circuit breaker at least equal to the predetermined amount.

17. A remote control system for racking a circuit breaker into and out of electric switchgear contained in a cell cabinet, wherein the circuit breaker is vertically movable by a racking mechanism between racked-in and racked-out positions with the circuit breaker having a plug which is electrically connected to a receptacle provided on the switchgear when the circuit breaker is in the racked-in position to provide power for operation of circuit breaker functions, said remote control system comprising:

a) a portable drive motor mounted in the cell cabinet;

b) coupling means for operatively connecting and disconnecting the racking mechanism and said drive motor;

c) an electrical connector mounted to extend through the cell cabinet;

d) a remote control device connected by an elongated cable to said electrical connector; and e) transfer means electrically connected to transfer operational control of said drive motor, said coupling means and the circuit-breaker functions through said electrical connector to said remote control device.

18. A remote control device as claimed in claim 17 and further comprising status-indicating means on said remote control device, said status-indicating means being electrically connected through said transfer means to receive status-indicating signals from the circuit breaker and from said coupling means.

19. A remote control device as claimed in claim 17 and further comprising an inclinometer mounted on the circuit breaker for detecting angular deviations in the attitude of the circuit breaker and producing at least one alarm signal when an angular deviation at least equal to a predetermined amount is detected.

20. A remote control device as claimed in claim 19 wherein said inclinometer is digital.

* * * * *